United States Patent
Kim et al.

(10) Patent No.: US 10,594,587 B2
(45) Date of Patent: Mar. 17, 2020

(54) OPERATION METHOD OF COMMUNICATION NODE FOR DIAGNOSING VEHICLE NETWORK

(71) Applicants: Hyundai Motor Company, Seoul (KR); Kia Motors Corporation, Seoul (KR)

(72) Inventors: Dong Ok Kim, Goyang-si (KR); Jun Byung Chae, Seoul (KR); Jin Hwa Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 28 days.

(21) Appl. No.: 15/831,138

(22) Filed: Dec. 4, 2017

(65) Prior Publication Data

US 2018/0367436 A1  Dec. 20, 2018

(30) Foreign Application Priority Data

Jun. 15, 2017 (KR) .................. 10-2017-0075607

(51) Int. Cl.
| | |
|---|---|
| *H04L 12/26* | (2006.01) |
| *H04L 12/46* | (2006.01) |
| *H04L 12/40* | (2006.01) |
| *H04L 12/24* | (2006.01) |

(52) U.S. Cl.
CPC .............. *H04L 43/50* (2013.01); *H04L 12/40* (2013.01); *H04L 12/40006* (2013.01); *H04L 12/4625* (2013.01); *H04L 41/046* (2013.01); *H04L 41/0677* (2013.01); *H04L 2012/40208* (2013.01); *H04L 2012/40273* (2013.01)

(58) Field of Classification Search
CPC combination set(s) only.
See application file for complete search history.

(56) References Cited

U.S. PATENT DOCUMENTS

| | | | |
|---|---|---|---|
| 2007/0150237 A1* | 6/2007 | Swarztrauber | G01D 4/002 702/188 |
| 2012/0072858 A1* | 3/2012 | Thoppae | H04L 63/08 715/763 |
| 2012/0173905 A1* | 7/2012 | Diab | H04L 12/66 713/320 |
| 2013/0201316 A1* | 8/2013 | Binder | H04L 67/12 348/77 |
| 2014/0036693 A1* | 2/2014 | Mabuchi | H04L 43/10 370/243 |
| 2017/0136894 A1* | 5/2017 | Ricci | H02J 7/025 |
| 2017/0138758 A1* | 5/2017 | Ricci | G01C 21/3673 |
| 2017/0242446 A1* | 8/2017 | Truong | H04L 43/08 |
| 2018/0015905 A1* | 1/2018 | Yorke | B60R 25/24 |

(Continued)

*Primary Examiner* — Khaled M Kassim
*Assistant Examiner* — Syed Ali
(74) *Attorney, Agent, or Firm* — Morgan, Lewis & Bockius LLP

(57) ABSTRACT

An operation method of a first switch, among a plurality of switches in a vehicle network including the plurality of switches connected through a bus line in a bus topology, may include receiving a diagnostic request message from an on-board diagnostic (OBD) apparatus through the bus line; performing a diagnostic operation indicated by the diagnostic request message; and transmitting a result of the diagnostic operation to the OBD apparatus through the bus line.

14 Claims, 8 Drawing Sheets

(56) References Cited

U.S. PATENT DOCUMENTS

2018/0048309 A1* 2/2018 Vogt, IV ................ H03K 17/00
2018/0198545 A1* 7/2018 Aichriedler ........... H04J 3/0652
2018/0201147 A1* 7/2018 Shin ....................... H04L 12/40

* cited by examiner

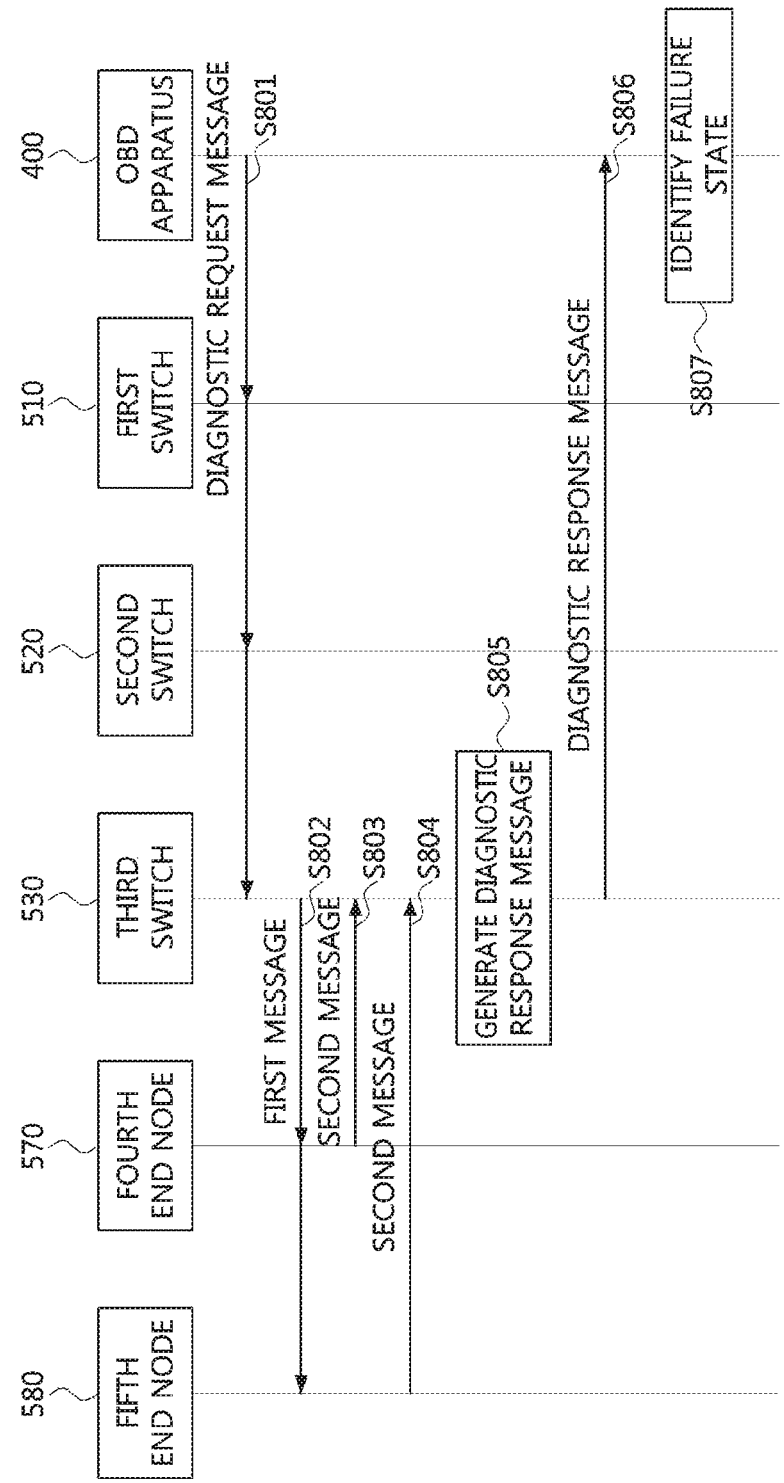

* # OPERATION METHOD OF COMMUNICATION NODE FOR DIAGNOSING VEHICLE NETWORK

CROSS-REFERENCE TO RELATED APPLICATIONS

The present application claims priority to Korean Patent Application No. 10-2017-0075607 filed on Jun. 15, 2017, the entire contents of which is incorporated herein for all purposes by this reference.

BACKGROUND OF THE INVENTION

Field of the Invention

The present invention relates to an operation method of a communication node for diagnosing a vehicle network, and more particularly, to an operation method of a communication node (e.g., a switch) for diagnosing an Ethernet-based network switch, which overcomes a limitation of a hierarchical connection structure of an Ethernet-based vehicle network.

Description of Related Art

Electronic devices disposed in a vehicle have been increased significantly in their number and variety along with recent digitalization of vehicle parts. The electronic devices may be used throughout the vehicle, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

The telematics system and the infotainment system, as most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

The Ethernet-based vehicle network may comprise a plurality of communication nodes. The communication nodes may include at least one gateway, at least one switch (or, at least one bridge), at least one end node, or the like. Here, a plurality of switches in the Ethernet-based vehicle network may be connected to each other in a hierarchical manner, and each of the plurality of switches may be connected to a plurality of end nodes. In such the environment, since the plurality of switches are connected in a hierarchical manner, in order for a first switch to diagnose a link status of a fifth switch connected through second to fourth switches among the plurality of switches, there is a problem that normal link statuses of the second to fourth switches should be ensured to correctly forward diagnosis-related messages from the first switch to the fifth switch.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an operation method of a communication node for diagnosing a plurality of switches connected in a hierarchical manner in an Ethernet-based vehicle network, which overcomes a limitation of a hierarchical connection structure of the Ethernet-based vehicle network.

In accordance with embodiments of the present invention, An operation method of a first switch among a plurality of switches in a vehicle network including the plurality of switches connected through a bus line in a bus topology may comprise receiving a diagnostic request message from an on-board diagnostic (OBD) apparatus through the bus line; performing a diagnostic operation indicated by the diagnostic request message; and transmitting a result of the diagnostic operation to the OBD apparatus through the bus line.

The plurality of switches may be connected through at least one of a first bus line for performing a pulse width modulation (PWM) based diagnosis and a second bus line for performing a power line communication (PLC) based diagnosis.

The first bus line may connect controllers each of which is disposed in each of the plurality of switches.

The performing a diagnostic operation may further include: when a controller of the first switch connected to the first bus line receives the diagnostic request message, generating, by the controller of the first switch, a first message including an indicator indicating the diagnostic operation; transmitting, by the controller of the first switch, the generated first message to a physical (PHY) layer of the first switch; and performing, by the PHY layer of the first switch, the diagnostic operation indicated by the indicator.

The diagnostic request message received through the controller of the first switch connected to the first bus line is transmitted at a predetermined frequency for performing the PWM based diagnosis, and the diagnostic request message may be modulated with a duty ratio indicating the diagnostic operation.

The second bus line may connect power circuits each of which is disposed in each of the plurality of switches.

The performing a diagnostic operation may further include: when a power circuit of the first switch connected to the second bus line receives the diagnostic request message, transmitting, by the power circuit of the first switch, the diagnostic request message to a controller of the first switch; generating, by the controller of the first switch, a first message including an indicator indicating the diagnostic operation; transmitting, by the controller of the first switch, the generated first message to a physical (PHY) layer of the first switch; and performing, by the PHY layer of the first switch, the diagnostic operation indicated by the indicator.

An identifier of each of the plurality of switches may be configured based on at least one dual in-line package (DIP) switch, and the diagnostic request message may include an identifier configured for the first switch.

The diagnostic request message may include an indicator indicating at least one of an operation of resetting the first switch, an operation of resetting at least one physical (PHY) layer included in the first switch, an operation of checking reception link state of the at least one PHY layer included in the first switch, and an operation of checking transmission link state of the at least one PHY layer included in the first switch.

Furthermore, in accordance with embodiments of the present invention, an operation method of an on-board diagnostic (OBD) apparatus for diagnosing a plurality of switches included in a vehicle network. Also, the plurality of switches may be connected through a bus line in a bus topology, and the operation method may comprise generating a diagnostic request message for diagnosing at least one switch of the plurality of switches; transmitting the generated diagnostic request message to the at least one switch via the bus line; receiving a diagnostic response message including information on a diagnostic result of the at least one switch from the at least one switch; and identifying a normal state or a failure state of the at least one switch based on the diagnostic response message.

The operation method may be performed when a diagnostic response message is not received through an Ethernet communication path in the vehicle network.

The diagnostic request message may include an indicator indicating at least one of an operation of resetting the at least one switch, an operation of resetting at least one physical (PHY) layer included in the at least one switch, an operation of checking reception link state of the at least one PHY layer included in the at least one switch, and an operation of checking transmission link state of the at least one PHY layer included in the at least one switch.

An identifier of each of the plurality of switches may be configured based on at least one dual in-line package (DIP) switch, and the diagnostic request message may include at least one identifier configured for the at least one switch.

The plurality of switches may be connected through at least one of a first bus line for performing a pulse width modulation (PWM) based diagnosis and a second bus line for performing a power line communication (PLC) based diagnosis.

The first bus line may connect controllers each of which is disposed in each of the plurality of switches.

The second bus line may connect power circuits each of which is disposed in each of the plurality of switches.

Furthermore, in accordance with embodiments of the present invention, a first switch of a plurality of switches connected through a bus line in a bus topology in a vehicle network may comprise a controller, at least one physical (PHY) layer, and a power circuit for supplying power to the first switch. Also, the controller may receive a diagnostic request message from an on-board diagnostic (OBD) apparatus connected to the bus line; the controller may identify a diagnostic operation indicated by the diagnostic request message; the controller may transmit an indicator requesting to perform the diagnostic operation to the at least one PHY layer; and the at least one PHY layer receiving the indicator may perform the diagnostic operation requested by the indicator.

The plurality of switches may be connected through at least one of a first bus line for performing a pulse width modulation (PWM) based diagnosis and a second bus line for performing a power line communication (PLC) based diagnosis.

The first bus line may connect controllers each of which is disposed in each of the plurality of switches, and the second bus line may connect power circuits each of which is disposed in each of the plurality of switches.

The diagnostic request message may include an indicator indicating at least one of an operation of resetting the at least one PHY) layer, an operation of checking reception link state of the at least one PHY layer, and an operation of checking transmission link state of the at least one PHY layer.

According to the exemplary embodiments of the present invention, it is implemented to efficiently manage a failure of a communication node by easily diagnosing a failure state of a plurality of communication nodes forming a vehicle network. Also, a link to be used for the diagnosis can be selected from a plurality of links (e.g., a link for diagnosis or a link for supplying power) which can be configured for diagnosing a failure state of the plurality of communication nodes in the vehicle network.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF DRAWINGS

FIG. 8 is a sequence chart for explaining a method of diagnosing a vehicle network according to an exemplary embodiment of the present invention in the vehicle network of FIG. 7.

Figure 1:
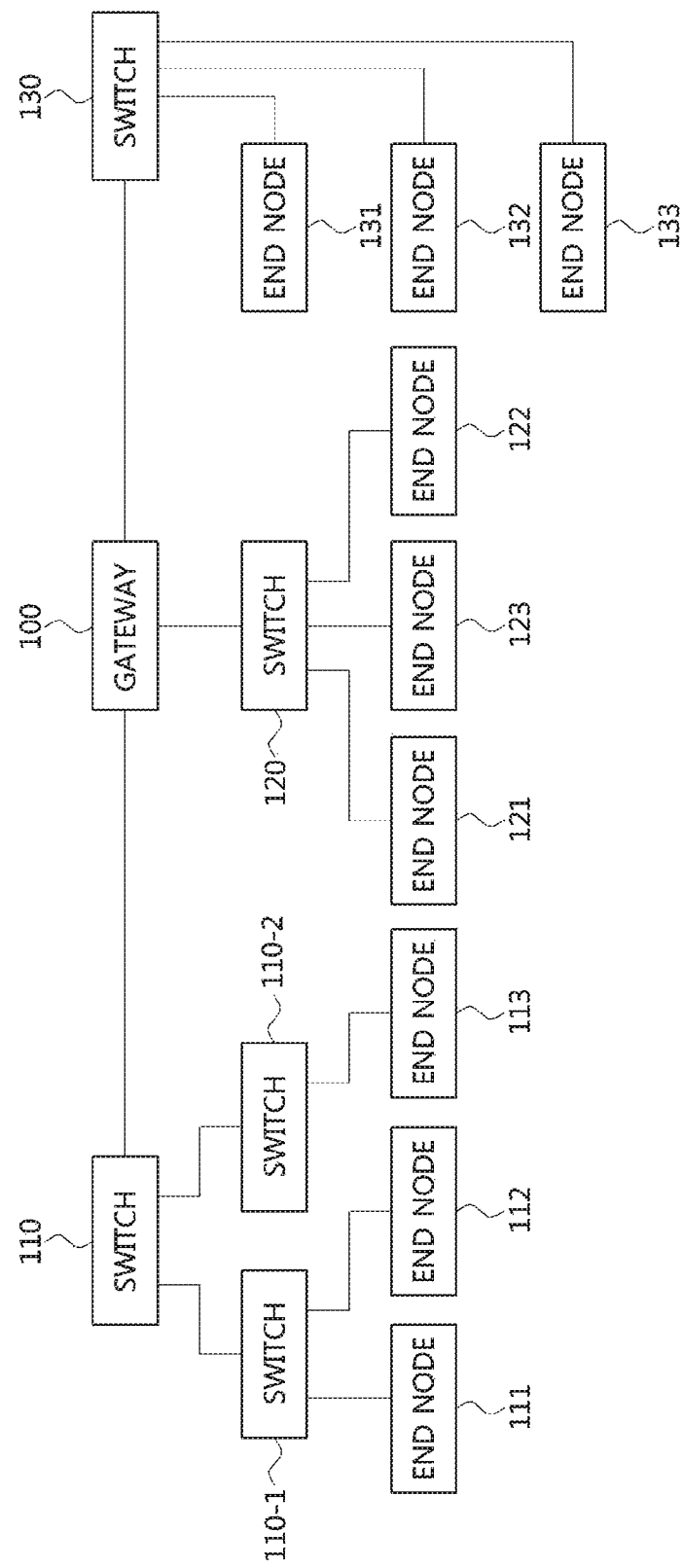
FIG. 1 is a diagram illustrating various exemplary embodiments of a vehicle network topology.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used herein is for describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in the present specification, specify the presence of stated features, integers, steps, operations, elements, and/or components, but do not preclude the presence or addition of one or more other features, integers, steps, operations, elements, components, and/or groups thereof. As used herein, the term "and/or" may include any and all combinations of one or more of the associated listed items.

It is understood that the term "vehicle" or "vehicular" or other similar term as used herein is inclusive of motor vehicles in general including passenger vehicles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of devices to perform the exemplary process, it is understood that the exemplary processes may also be performed by one or plurality of modules. Additionally, it is understood that a controller/control device may perform one or more of the processes described further below, and the term controller/control device refers to a hardware device that includes a memory and a processor. The memory is configured to store the modules, and the processor is configured to execute the modules to perform one or more processes which are described further below. Moreover, it is understood that the devices or modules described herein may embody a controller/control device configured for controlling operation of the device or module.

Furthermore, control logic of the present invention may be embodied as non-transitory computer readable media on a computer readable medium including executable program instructions executed by a processor, controller/control device or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present invention may be variously modified and have several forms, specific embodiments will be shown in the accompanying drawings and be described more specifically in the detailed description. It should be understood, however, that it is not intended to limit the present invention to the specific embodiments but, on the contrary, the present invention is to cover all modifications and alternatives falling within the spirit and scope of the present invention.

Relational terms including first, second, and the like may be used for describing various elements, but the elements should not be limited by the terms. These terms are only used to distinguish one element from another. For example, a first component may be named a second component without being departed from the scope of the present invention and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which the present disclosure belongs. Terms such as terms that are generally used and have been in dictionaries should be construed as having meanings matched with contextual meanings in the art. In the present description, unless defined clearly, terms are not ideally, excessively construed as formal meanings.

Hereinafter, forms of the present invention will be described more specifically with reference to the accompanying drawings. In describing the disclosure, to facilitate the entire understanding of the disclosure, like numbers refer to like elements throughout the description of the figures and the repetitive description thereof will be omitted.

FIG. 1 is a diagram illustrating various exemplary embodiments of a vehicle network topology.

Referring to FIG. 1, a communication node forming a vehicle network may be a gateway, a switch (or bridge), or an end node. The gateway 100 may be connected to at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

Meanwhile, the communication nodes (i.e., gateways, switches, end nodes, etc.) forming the vehicle network may be connected in a star topology, a bus topology, a ring topology, a tree topology, a mesh topology, or the like. Furthermore, each of the communication nodes forming the vehicle network may support the CAN protocol, the FlexRay protocol, the MOST protocol, the LIN protocol, the Ethernet protocol, or the like. Embodiments according to an exemplary embodiment of the present invention may be applied to the network topologies described above, and the network topology to which the exemplary embodiments according to an exemplary embodiment of the present invention are applied is not limited to these, and may be variously configured.

Figure 2:
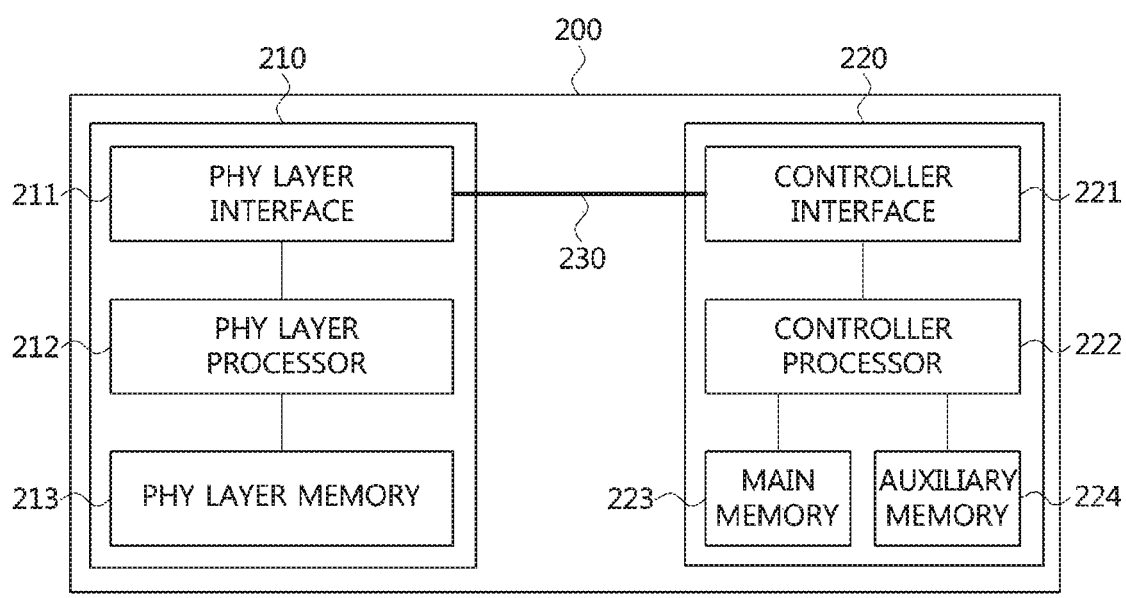
FIG. 2 is a diagram illustrating various exemplary embodiments of a communication node belonging to a vehicle network.

FIG. 2 is a diagram illustrating various exemplary embodiments of a communication node belonging to a vehicle network.

Referring to FIG. 2, a communication node 200 forming a vehicle network illustrated in, e.g., FIG. 1, may include a physical (PHY) layer 210 and a controller 220. Also, the communication node 200 may further include a regulator or for supplying power. The controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like.). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and an auxiliary memory 224. The controller processor 222 is an electric circuitry which performs various functions described below. The configuration of the controller 220 is not limited thereto, and the controller 220 may be configured in various ways. The controller interface 221 may be configured to receive a signal from the PHY layer 210 (e.g., the PHY layer interface 211) or an upper layer, transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Figure 3:
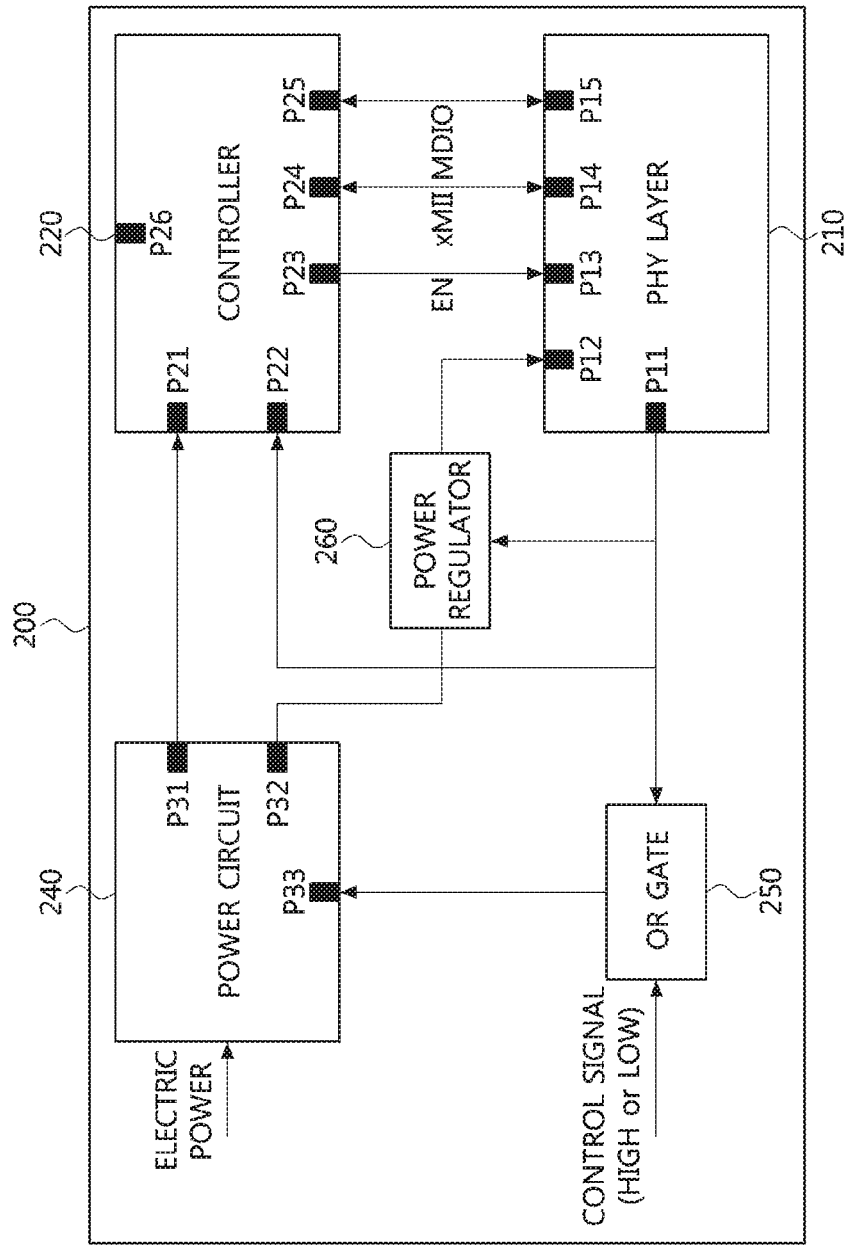
FIG. 3 is a diagram illustrating various exemplary embodiments of a communication node belonging to a vehicle network.

FIG. 3 is a diagram illustrating various exemplary embodiments of a communication node belonging to a vehicle network.

Referring to FIG. 3, the communication node 200 may comprise the PHY layer 210, the controller 220, a power circuit 240, an OR gate 250, a power regulator 260, and the like. Each of the PHY layer 210 and the controller 220 shown in FIG. 3 may be the same as or similar to the PHY layer 210 and the controller 220 shown in FIG. 2.

The PHY layer 210 may include a plurality of pins (e.g., P11, P12, P13, P14, and P15). The PHY layer 210 may output a signal for instructing power supply, a signal for instructing power-off, etc. through P11. For example, a HIGH signal output through P11 of the PHY layer 210 may indicate the power supply, and a LOW signal output through P11 of the PHY layer 210 may indicate the power-off. The P11 of the PHY layer 210 may denote an inhibit (INH) pin. Alternatively, the PHY layer 210 may output an interrupt signal via P11. For example, a HIGH signal output through P11 of the PHY layer 210 may signify an interrupt signal, and the interrupt signal may be received at P22 of the controller 220. The interrupt signal may instruct transition from the sleep mode to the normal mode. Here, the P11 may denote an interrupt pin.

Electric power may be supplied from the power circuit 240 through P12 of the PHY layer 210. The PHY layer 210 may receive a signal instructing a transition from the sleep mode to the normal mode, a signal instructing a transition from the normal mode to the sleep mode, and the like via P13. For example, a HIGH signal input through P13 of the PHY layer 210 may instruct the transition from the sleep mode to the normal mode, and a LOW signal input through P13 of the PHY layer 210 may instruct the transition from the normal mode to the sleep mode. The P13 of the PHY layer 210 may denote an enable (EN) pin.

The P14 of PHY layer 210 may be used for xMII and the P15 of PHY layer 210 may be used for a management data input/output (MDIO) interface. For example, the PHY layer 210 may transmit and receive signals (e.g., Ethernet related signals) with the controller 220 using P14 and P15. The setting of each of the plurality of pins included in the PHY layer 210 is not limited to that described above, and each of the plurality of pins included in the PHY layer 210 may be variously configured.

The controller 220 may include a plurality of pins (e.g., P21, P22, P23, P24, P25, and P26). Electric power may be supplied from the power circuit 240 via P21 of the controller 220. The controller 220 may receive an interrupt signal via P22. For example, a HIGH signal input through P22 of the controller 220 may signify an interrupt signal. The controller 220 may transition from the sleep mode to the normal mode upon receiving the interrupt signal. The P22 of the controller 220 may denote an interrupt pin.

The controller 220 may output a signal instructing a transition from the sleep mode to the normal mode, a signal instructing a transition from the normal mode to the sleep mode, and the like via P23. For example, a HIGH signal output through P23 of the controller 220 may instruct the transition from the sleep mode to the normal mode, and a LOW signal output through the P23 of the controller 220 may instruct the transition from the normal mode to the sleep mode. The P23 of the controller 220 may denote the EN pin.

The P24 of the controller 220 may be used for xMII and the P25 of the controller 220 may be used for the MDIO interface. For example, the controller 220 may transmit and receive signals (e.g., Ethernet related signals) with the PHY layer 210 using P24 and P25. The controller 220 may detect a local wake-up signal (e.g., a local event) via P26. For example, a HGH signal input through P26 of the controller 220 may indicate a local wake-up signal. The P26 of the controller 220 may denote a WAKE pin. The setting of each of the plurality of pins included in the controller 220 is not limited to that described above, and each of the plurality of pins included in the controller 220 may be variously configured.

The power circuit 240 may include a plurality of pins (e.g., P31, P32, and P33). The power circuit 240 may receive a signal for instructing power supply, a signal for instructing power-off, and the like through P33. For example, a HIGH signal input via P33 of the power circuit 240 may indicate the power supply, and a LOW signal input from P33 of the power circuit 240 may indicate the power-off. The power circuit 240 may supply power based on the signal input through P33. For example, the power circuit 240 may supply power to the controller 220 via P31 and power to the PHY layer 210 via P32. The setting of each of the plurality of pins included in the power circuit 240 is not limited to that described above, and each of the plurality of pins included in the power circuit 240 may be variously configured.

The OR gate 250 may receive a control signal (e.g., a HIGH signal or a LOW signal) from an arbitrary entity (e.g., the controller 220), and a control signal (e.g., a HIGH signal or a LOW signal) from the PHY layer 210. The OR gate 250 may perform an OR operation on the control signals received from the arbitrary entity and the PHY layer 210, and may output a result of the OR operation. The result of the OR operation may be input to P33 of the power circuit 240.

An input end portion of the power regulator 260 may be connected to P32 of the power circuit 240 and an output end portion of the power regulator 260 may be connected to P12 of the PHY layer 210. When a voltage of the power supplied from the power circuit 240 exceeds a predetermined threshold value (e.g., 3.3 V), the power regulator 260 may regulate the voltage of the supplied power to the predetermined threshold value or less, and supply power having the regulated voltage to the PHY layer 210.

In the following description, a method performed at a communication node belonging to a vehicle network and a corresponding counterpart communication node will be described. Hereinafter, even when a method (e.g., transmission or reception of a signal) to be performed at a first communication node is described, a corresponding second communication node may perform a method (e.g., reception or transmission of the signal) corresponding to the method performed at the first communication node. That is, when an operation of the first communication node is described, the corresponding second communication node may perform an operation corresponding to the operation of the first communication node. Conversely, when an operation of the second communication node is described, the corresponding first communication node may perform an operation corresponding to the operation of the second communication node.

Figure 4:
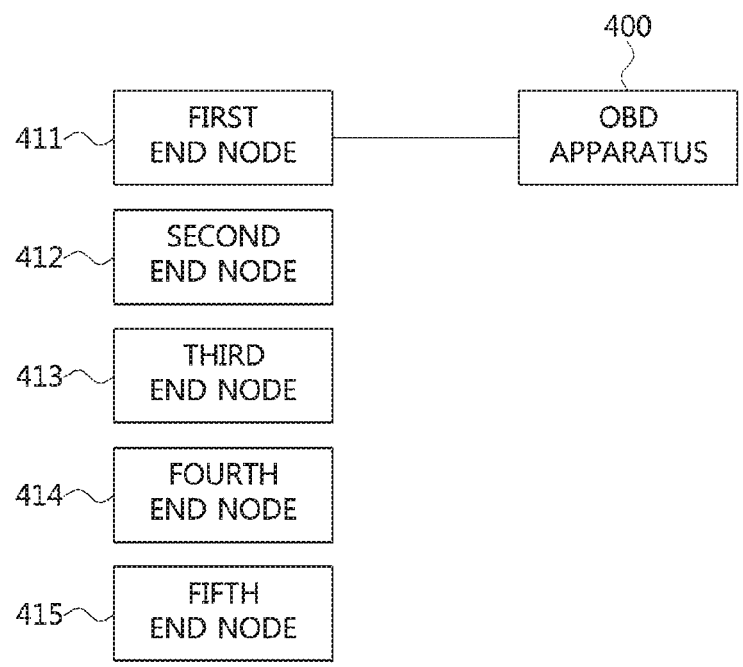
FIG. 4 is a diagram illustrating an exemplary embodiment of a method of diagnosing a vehicle network using an on-board diagnostic (OBD) apparatus.

FIG. 4 is a diagram illustrating an exemplary embodiment of a method of diagnosing a vehicle network using an on-board diagnostic (OBD) apparatus.

Referring to FIG. 4, end nodes 411, 412, 413, 414, and 415 may constitute the vehicle network described with reference to FIG. 1, and may support the Ethernet protocol. Each of the end nodes 411, 412, 413, 414, and 415 may refer to the communication node 200 described with reference to FIG. 2. The end nodes 411, 412, 413, 414, and 415 may be connected to a same switch or may be connected to different switches. To diagnose a state (i.e., a normal state or a failure state) of each of the end nodes 411, 412, 413, 414 and 415 and a state of a channel (or, port) to which each of the end node 411, 412, 413, 414, and 415 is connected, each of the end nodes 411, 412, 413, 414, and 415 should be connected to an OBD apparatus 411 in one-to-one manner. For example, to diagnose a state of the first end node 411 and a state of a channel to which the first end node 411 is connected, the OBD apparatus 400 should physically be connected to the first end node 411 in one-to-one manner.

In a case that the OBD apparatus 400 and the first end node 411 are connected in one-to-one manner, the OBD apparatus 400 may generate a diagnostic request message and transmit the generated diagnostic request message to the first end node 411. Upon receiving the diagnostic request message, the first end node 411 may generate a diagnostic response message, which is a response to the diagnostic request message, and transmit the generated diagnostic response message to the OBD apparatus 400. Alternatively, upon receiving the diagnostic request message, the first end node 411 may transmit an acknowledgment (ACK) message to the OBD apparatus 400, which is a response to the diagnostic request message. If the OBD apparatus 400 receives the diagnostic response message (or ACK message) from the first end node 411 within a predetermined time from an end time of the transmission of the diagnostic request message, the OBD apparatus 400 may determine the first end node 411 and the channel to which the first end node 411 is connected to be in the normal state. On the other hand, if the OBD apparatus 400 fails to receive the diagnostic response message (or ACK message) from the first end node 411 within the predetermined time from the end time of the transmission of the diagnostic request message, the OBD apparatus may determine the first end node 411 and the channel to which the first end node 411 is connected to be in the failure state.

The OBD apparatus 400 may determine a state for each of the remaining end nodes 412, 413, 414, and 415 by performing the above procedure with the remaining end nodes 412, 413, 414, and 415. Meanwhile, since the vehicle network may be configured with a very large number of end nodes, in order to determine the state of each of the end nodes forming the vehicle network, a procedure for physically connecting the OBD apparatus and each of the end nodes in one-to-one manner, and a procedure for exchanging diagnostic messages between the OBD apparatus and each of the end nodes should be performed for all the end nodes forming the vehicle network. In the instant case, it takes a lot of time to determine the state of each end node forming the vehicle network.

Figure 5:
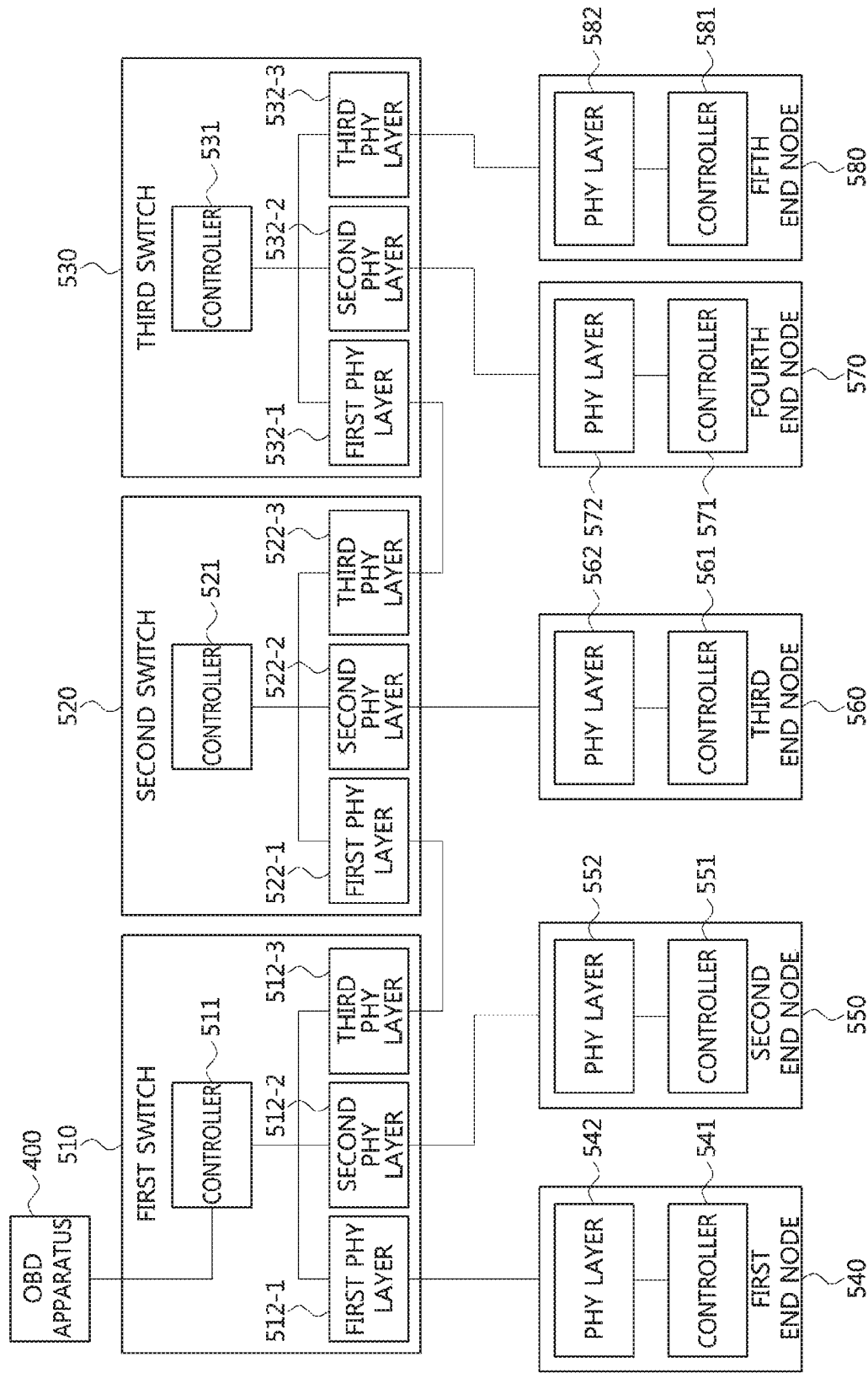
FIG. 5 is a diagram illustrating a vehicle network for explaining another exemplary embodiment of a method of diagnosing a vehicle network using an OBD apparatus.
Figure 6:
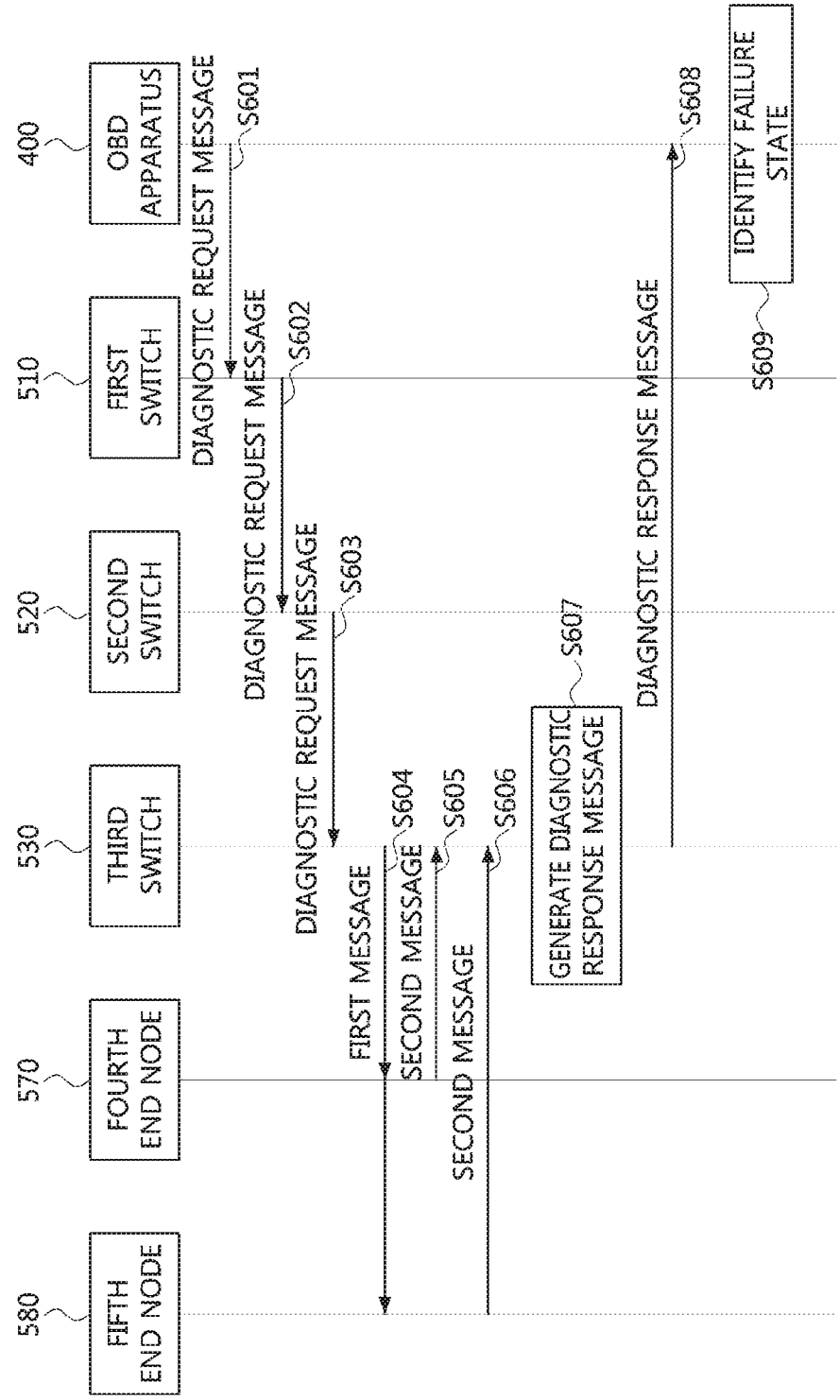
FIG. 6 is a sequence chart for explaining another exemplary embodiment of a method of diagnosing a vehicle network using an OBD apparatus in the vehicle network of FIG. 5.

FIG. 5 is a diagram illustrating a vehicle network for explaining another exemplary embodiment of a method of diagnosing a vehicle network using an OBD apparatus, and FIG. 6 is a sequence chart for explaining another exemplary embodiment of a method of diagnosing a vehicle network using an OBD apparatus in the vehicle network of FIG. 5.

Referring to FIG. 5 and FIG. 6, a vehicle network may include an OBD apparatus 400, a first switch 510, a second switch 520, a third switch 530, a first end node 540, a second end node 550, a third end node 560, a fourth end node 570, a fifth end node 580, and the like. The switches 510, 520 and 530 may perform the same or similar functions as the switches shown in FIG. 1, and the end nodes 540, 550, 560, 570, and 580 may perform the same or similar functions as the end nodes shown in FIG. 1. Each of the switches 510, 520, and 530 and the end nodes 540, 550, 560, 570, and 580 may be configured to be the same as or similar to the communication node shown in FIG. 2, FIG. 3 and FIG. 4.

For example, the first switch 510 may include a controller 511, a first PHY layer 512-1, a second PHY layer 512-2, and a third PHY layer 512-3, and each of the controller 511 and the PHY layers 512-1, 512-2, and 512-3 included in the first switch 510 may be the same as or similar to the controller 220 or the PHY layer 210 described with reference to FIG. 2 and FIG. 3. The second switch 520 may include a controller 521, a first PHY layer 522-1, a second PHY layer 522-2, and a third PHY layer 522-3, and each of the controller 521 and the PHY layers 522-1, 522-2, and 522-3 included in the second switch 520 may be the same as or similar to the controller 220 or the PHY layer 210 described with reference to FIG. 2 and FIG. 3. The third switch 530 may include a controller 531, a first PHY layer 532-1, a second PHY layer 532-2, and a third PHY layer 532-3, and each of the controller 531 and the PHY layers 532-1, 532-2, and 532-3 included in the third switch 530 may be the same as or similar to the controller 220 or the PHY layer 210 described with reference to FIG. 2 and FIG. 3. Each of the end nodes 540, 550, 560, 570, and 580 may include controller 541, 551, 561, 571, or 581 and PHY layer 542, 552, 562, 572, or 582. Each of the controllers 541, 551, 561, 571, and 581 and the PHY layers 542, 552, 562, 572, and 582 included in the end nodes 540, 550, 560, 570, and 580 may be the same as or similar to the controller 220 or the PHY layer 210 described with reference to FIG. 2 and FIG. 3.

The OBD apparatus 400 may be connected to one of the switches 510, 520, and 530 (e.g., the controller 511 of the first switch 510). The first switch 510 may be connected to the OBD apparatus 400 via the controller 511, connected to the first end node 540 (e.g., the PHY layer 542 of the first end node 540) via the PHY layer 512-1, connected to the second end node 550 (e.g., the PHY layer 552 of the second end node 550) via the PHY layer 512-2, and connected to the second switch 520 (e.g., the PHY layer 522-1 of the second switch 520) via the PHY layer 512-3. Communications between the first switch 510 and the second switch 250 may be performed using one interface among MII, RMII, GMII, RGMII, SGMII, and XGMII. The second switch 520 may be connected to the first switch 510 (e.g., the PHY layer 512-3 of the first switch 510) via the PHY layer 522-1, connected to the third end node 560 (e.g., the PHY layer 562 of the third end node 560) via the PHY layer 522-2, and connected to the third switch 530 (e.g., the PHY layer 532-1 of the third switch 530) via the PHY layer 522-3. Communications between the second switch 520 and the third switch 530 may be performed using one interface among MII, RMII, GMII, RGMII, SGMII, and XGMII. The third switch 530 may be connected to the second switch 520 (e.g., the PHY layer 522-3 of the second switch 520) via the PHY layer 532-1, connected to the fourth end node 570 (e.g., the PHY layer 572 of the fourth end node 570) via the PHY layer 532-2, and connected to the fifth end node 580 (e.g., the PHY layer 582 of the fifth end node 580) via the PHY layer 532-3.

Meanwhile, the OBD apparatus 400 may generate a diagnostic request message and transmit the generated diagnostic request message to the first switch 510 (S801). As such, the first switch 510 may receive the diagnostic request message from the OBD apparatus 400 via the controller 511. As such, the first switch 510 may identify a destination address included in the diagnostic request message and route the diagnostic request message based on the identified destination address. That is, assuming that the destination address included in the diagnostic request message indicates the third switch 530, the first switch 510 may forward the diagnostic request message to the second switch 520 connected to the third switch 530 (S602). The first switch 510 may transmit the diagnostic request message through the PHY layer 512-3 connected to the PHY layer 522-1 of the second switch 520.

As such, the second switch 520 may receive the diagnostic request message from the first switch 510 through the PHY layer 522-1 connected to the PHY layer 512-3. As such, the second switch 520 may also identify the destination address included in the diagnostic request message and route the diagnostic request message based on the identified destination address. That is, since it is assumed that the destination address included in the diagnostic request message indicates the third switch 530, the second switch 520 may forward the diagnostic request message to the third switch 530 (S603). The second switch 520 may transmit the diagnostic request message through the PHY layer 522-3 connected to the PHY layer 532-1 of the third switch 530.

As such, the third switch 530 may receive the diagnostic request message from the second switch 520 via the PHY layer 532-1 connected to the PHY layer 522-3 of the second switch 520. Thereafter, the third switch 530 may also identify the destination address included in the diagnostic request message, and may determine that the received diagnostic request message is a diagnostic request message transmitted to itself based on the identified destination address. Thereafter, the third switch 530 may identify an indicator indicating a diagnostic operation included in the diagnostic request message, and may perform the diagnostic operation indicated by the identified indicator. Here, the diagnostic request message may include an indicator indicating at least one of an operation of resetting the third switch 530, an operation of resetting the PHY layers 532-1, 532-2, and 532-3 included in the third switch 530, an operation of checking reception link states of the PHY layers 532-1, 532-2, and 532-3 included in the third switch 530, and an operation of checking transmission link states of the PHY layers 532-1, 532-2, and 532-3 included in the third switch 530.

Here, it is assumed that the indicator included in the diagnostic request message is an indicator indicating the diagnostic operation of checking reception link states of the PHY layers 532-1, 532-2, and 532-3 included in the third switch 530. Since the third switch has received the diagnostic request message through the PHY layer 532-1, the third switch 530 may determine that the PHY layer 532-1 is in the normal state. Also, the third switch 530 may generate a first message for determining states of the remaining PHY layers 532-2 and 532-3 except for the PHY layer 532-1. As such, the third switch 530 may transmit the generated first message to the fourth end node 570 and the fifth end node 580 (S604). The third switch 530 may transmit the first message to the fourth end node 570 via the PHY layer 532-2 connected to PHY layer 572 of the fourth end node 570, and may transmit the first message to the fifth end node 580 via the PHY layer 532-3 connected to the PHY layer 582 of the fifth end node 580.

As such, the fourth end node 570 may receive the first message from the third switch 530 via the PHY layer 572. The fourth end node 570 may then generate a second message (or ACK message) which is a response to the first message. Thereafter, the fourth end node 570 may transmit the generated second message to the third switch 530 via the PHY layer 572 (S605). Meanwhile, the fifth end node 580 may receive the first message from the third switch 530 via the PHY layer 582. The fifth end node 580 may then generate a second message (or ACK message) which is a response to the first message. Thereafter, the fifth end node 580 may transmit the generated second message to the third switch 530 via the PHY layer 582 (S606).

Meanwhile, the third switch 530 may receive the second messages (or, ACK messages) from the fourth end node 570 and the fifth end node 580, which are responses to the first message. The third switch 530 may receive the second message (or, ACK message) from the fourth end node 570 via the PHY layer 532-2, and the second message (or, ACK message) from the fifth end node 580 via the PHY layer 532-3. At the present time, when the third switch 530 receives the second messages (or, ACK messages) from the fourth end node 570 and the fifth end node 580, the third switch 530 may determine that the PHY layer 532-2 connected to the fourth end node 570 and the PHY layer unit 532-3 connected to the fifth end node 580 are in the normal state. On the other hand, when the third switch 530 fails to receive the second message (or ACK message) within a predetermined time from an end time of the transmission of the first message, the third switch 530 may determine a state of the PHY layer of the third switch 530, which is connected to the end node that has not transmitted the second message, to be in the failure state. Also, the third switch 530 may determine that the state of the end node that has not transmitted the second message (or ACK message) is in the failure state.

Thereafter, the third switch 530 may generate a diagnostic response message (S607). Here, the diagnostic response message may include at least one indicator indicating states of the PHY layers 532-1, 532-2, and 532-3 (e.g., at least one indicator each of which indicates a failure state or a normal state of the corresponding PHY layer), at least one identifier each of which indicates the end node determined as the failure state, and the like. Thereafter, the third switch 530 may transmit the diagnostic response message to the OBD apparatus 400 (S608). In FIG. 6, the third switch 530 is shown as transmitting the diagnostic response message directly to the OBD apparatus 400, but this may be for ease of explanation. That is, the method of transmitting the diagnostic response message from the third switch 530 to the OBD apparatus 400 may be performed similarly to the steps S601, S602, and S603 for transmitting the diagnostic request message from the OBD apparatus 400 to the third switch 530.

The third switch 530 may transmit the diagnostic response message to the second switch 520 through the PHY layer 532-1. As such, the second switch 520 may receive the diagnostic response message from the third switch 530 through the PHY layer 522-3 connected to the PHY layer 532-1 of the third switch 530. As such, the second switch 520 may identify the destination address included in the diagnostic response message and route the diagnostic response message based on the identified destination address. That is, since it is assumed that the destination address included in the diagnostic response message indicates the OBD apparatus 400, the second switch 520 may forward the diagnostic response message to the first switch 510 connected to the OBD apparatus 400. The second switch 520 may transmit the diagnostic response message through the PHY layer 522-1 connected to the PHY layer 512-3 of the first switch 510. Thereafter, the first switch 510 may receive the diagnostic response message from the second switch 520 through the PHY layer 512-3 connected to the PHY layer 522-1 of the second switch 520. As such, the first switch 510 may identify the destination address included in the diagnostic response message and route the diagnostic response message based on the identified destination address. That is, since it is assumed that the destination address included in the diagnostic response message indicates the OBD apparatus 400, the first switch 510 may forward the diagnostic response message to the OBD apparatus 400. The first switch 510 may transmit the diagnostic response message to the OBD apparatus 400 through the controller 511 connected to the OBD apparatus 400.

Thereafter, the OBD apparatus 400 may receive the diagnostic response message from the first switch 510, which is a response to the diagnostic request message. As such, the OBD apparatus 400 may identify the states of the PHY layers 532-1, 532-2, and 532-3 included in the third switch 530, by checking at least one indicator indicating the states of the PHY layers 532-1, 532-2, and 532-3 of the third switch 530 and at least one identifier indicating at least one end node in the failure state which are included in the diagnostic response message (S609).

According to the above-described method, the OBD apparatus 400 may identify failure states of the switches 510, 520, and 530, or the end nodes 540, 550, 560, 570, and 580 connected to the switches 510, 520, and 530. However, in a case that the first switch 510 or the second switch 520 is in the failure state in a process of checking the failure state of the third switch 530, the OBD apparatus may fail to receive the diagnostic response message. In such a case, the OBD apparatus 400 may have difficulty in determining which one of the switches 510, 520, and 530 is in the failure state.

Figure 7:
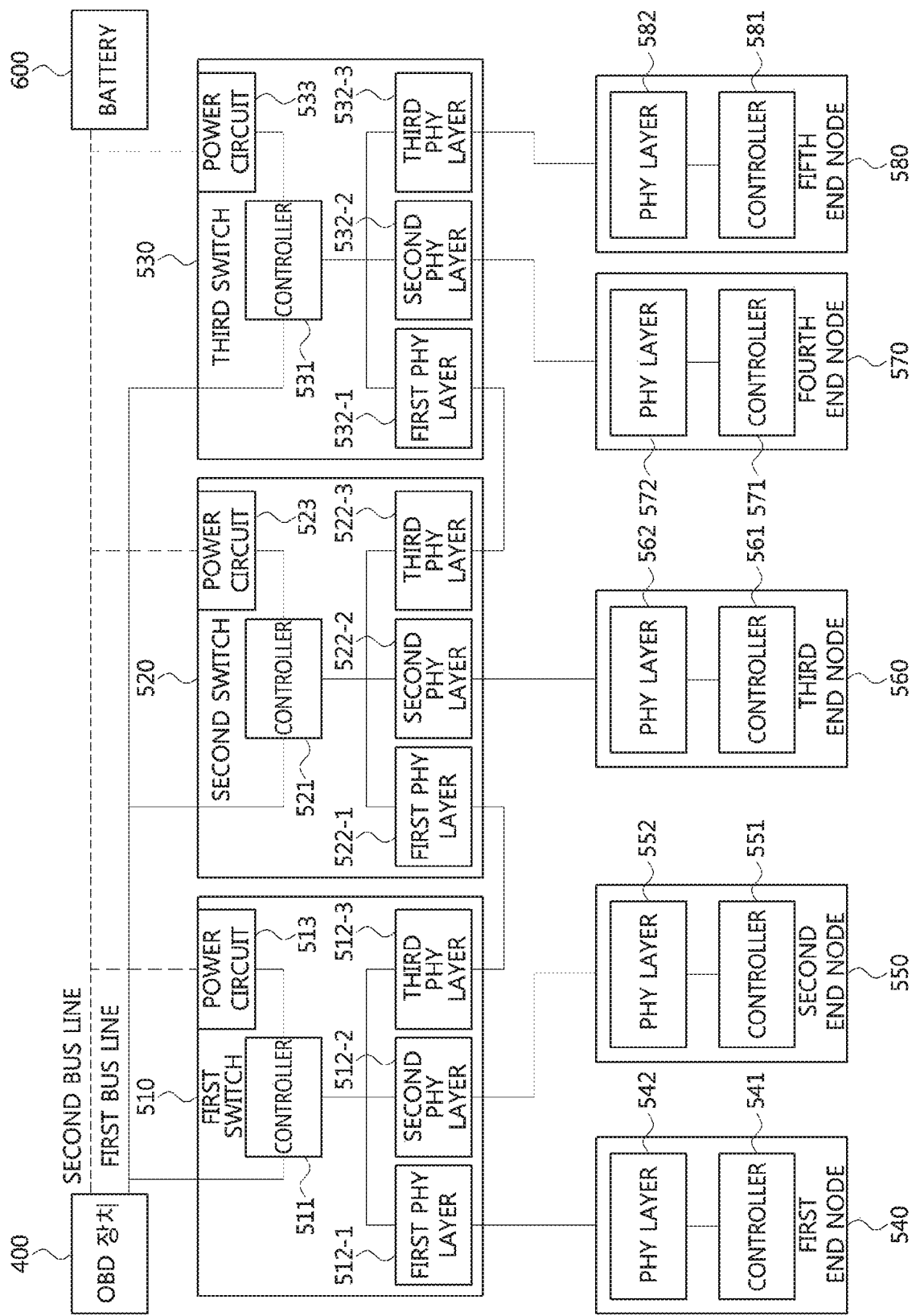
FIG. 7 is a diagram illustrating a vehicle network for explaining a method of diagnosing a vehicle network according to an exemplary embodiment of the present invention.

FIG. 7 is a diagram illustrating a vehicle network for explaining a method of diagnosing a vehicle network according to an exemplary embodiment of the present invention, and FIG. 8 is a sequence chart for explaining a method of diagnosing a vehicle network according to an exemplary embodiment of the present invention in the vehicle network of FIG. 7.

Referring to FIGS. 7 and 8, a vehicle network may include an OBD apparatus 400, a first switch 510, a second switch 520, a third switch 530, a first end node 540, a second end node 550, a third end node 560, a fourth end node 570, a fifth end node 580, and the like. The switches 510, 520 and 530 may perform the same or similar functions as the switches shown in FIG. 1, and the end nodes 540, 550, 560, 570, and 580 may perform the same or similar functions as the end nodes shown in FIG. 1. Each of the switches 510, 520, and 530 and the end nodes 540, 550, 560, 570, and 580 may be configured to be the same as or similar to the communication node shown in FIG. 2, FIG. 3 and FIG. 4.

For example, the first switch 510 may include a controller 511, a first PHY layer 512-1, a second PHY layer 512-2, a third PHY layer 512-3, and a power circuit 513 and each of the controller 511, the PHY layers 512-1, 512-2, and 512-3, and the power circuit 513 included in the first switch 510 may be the same as or similar to the controller 220, the PHY layer 210, or the power circuit 240 described with reference to FIG. 2 and FIG. 3. The second switch 520 may include a controller 521, a first PHY layer 522-1, a second PHY layer 522-2, a third PHY layer 522-3, and a power circuit 523 and each of the controller 521, the PHY layers 522-1, 522-2, and 522-3, and the power circuit 523 included in the second switch 520 may be the same as or similar to the controller 220, the PHY layer 210, or the power circuit 240 described with reference to FIG. 2 and FIG. 3. The third switch 530 may include a controller 531, a first PHY layer 532-1, a second PHY layer 532-2, a third PHY layer 532-3, and a power circuit 533 and each of the controller 531, the PI—W layers 532-1, 532-2, and 532-3, and the power circuit 533 included in the third switch 530 may be the same as or similar to the controller 220, the PHY layer 210, or the power circuit 240 described with reference to FIG. 2 and FIG. 3. Each of the end nodes 540, 550, 560, 570, and 580 may include controller 541, 551, 561, 571, or 581 and PHY layer 542, 552, 562, 572, or 582. Each of the controllers 541, 551, 561, 571, and 581 and the PHY layers 542, 552, 562, 572, and 582 included in the end nodes 540, 550, 560, 570, and 580 may be the same as or similar to the controller 220 or the PHY layer 210 described with reference to FIG. 2 and FIG. 3.

The OBD apparatus 400 may be connected to the switches 510, 520, and 530 through a bus line to form a bus topology. The OBD apparatus 400 may form a bus topology through a first bus line connected to the controllers 511, 521, and 531 of the switches 510, 520, and 530. The first bus line may be a bus line for performing pulse width modulation (PWM) based diagnoses. Also, the OBD apparatus 400 may form a bus topology through a second bus line connected to the power circuits 513, 523, and 533 of the switches 510, 520, and 530. The second bus line may be a bus line for performing power line communication (PLC) based diagnoses. That is, the second bus line may be a bus line that supplies power from the battery 600 to the switches 510, 520, and 530. In other words, the OBD apparatus 400 may form a bus topology via the second bus line that provides power to the switches 510, 520, and 530.

The first switch 510 may be connected to the OBD apparatus 400 via the controller 511 connected to the first bus line and/or the power circuit 513 connected to the second bus line. Also, the first switch 510 may be connected to the first end node 540 (e.g., the PHY layer 542 of the first end node 540) via the PHY layer 512-1, connected to the second end node 550 (e.g., the PHY layer 552 of the second end node 550) via the PHY layer 512-2, and connected to the second switch 520 (e.g., the PHY layer 522-1 of the second switch 520) via the PHY layer 512-3. Communications between the first switch 510 and the second switch 520 may be performed using one interface among MII, RMII, GMII, RGMII, SGMII, and XGMII.

The second switch 520 may be connected to the OBD apparatus 400 via the controller 521 connected to the first bus line and/or the power circuit 523 connected to the second bus line. Also, the second switch 520 may be connected to the first switch 510 (e.g., the PHY layer 512-3 of the first switch 510) via the PHY layer 522-1, connected to the third end node 560 (e.g., the PHY layer 562 of the third end node 560) via the PHY layer 522-2, and connected to the third switch 530 (e.g., the PHY layer 532-1 of the third switch 530) via the PHY layer 522-3. Communications between the second switch 520 and the third switch 530 may be performed using one interface among MII, RMII, GMII, RGMII, SGMII, and XGMII.

The third switch 530 may be connected to the OBD apparatus 400 via the controller 531 connected to the first bus line and/or the power circuit 532 connected to the second bus line. Also, the third switch 530 may be connected to the second switch 520 (e.g., the PHY layer 522-3 of the second switch 520) via the PHY layer 532-1, connected to the fourth end node 570 (e.g., the PHY layer 572 of the fourth end node 570) via the PHY layer 532-2, and connected to the fifth end node 580 (e.g., the PHY layer 582 of the fifth end node 580) via the PHY layer 532-3.

Meanwhile, the OBD apparatus 400 may generate a diagnostic request message and transmit the generated diagnostic request message to the first switch 510 (e.g., the controller 511 of the first switch 510) through an Ethernet path of the vehicle network. As such, when the OBD apparatus 400 fails to receive a diagnostic response message (or ACK message) in a response to the diagnostic request message within a predetermined time from an end time of the transmission of the diagnostic request message, the OBD apparatus 400 may perform an operation to be described later. The OBD apparatus 400 may transmit the diagnostic request message to the switches 510, 520, and 530 through at least one of the first bus line and the second bus line (S801). Here, the diagnostic request message transmitted through the first bus line from the OBD apparatus 400 may be transmitted at a predetermined frequency for the PWM based diagnosis, and the diagnostic request message may be modulated with a duty ratio indicating a diagnostic operation.

As such, the switches 510, 520, and 530 may receive the diagnostic request message transmitted from the OBD apparatus 400. When the diagnostic request message is transmitted through the first bus line, the switches 510, 520, and 530 may receive the diagnostic request message through the controllers 511, 521, and 531 connected to the first bus line. Also, the diagnostic request message received through the first bus line may be transmitted at a predetermined frequency for the PWM based diagnosis as modulated with a duty ratio indicating a diagnostic operation, as described in the step S801. On the other hand, when the diagnostic request message is transmitted through the second bus line from the OBD apparatus 400, the switches 510, 520, 530 may receive the diagnostic request message through the power circuits 513, 523, and 533 connected to the second bus line. At the present time, when the diagnostic request message is received from the OBD apparatus 400 through the power circuits 513, 523, and 533 connected to the second bus line, the received diagnostic request message may be transmitted from the power circuits 513, 523, and 533 to the controllers 511, 521, and 531.

As such, the switches 510, 520, and 530 may identifier at least one identifier included in the diagnostic request message. Here, it may be assumed that the at least one identifier included in the diagnostic request message may include the identifier of the third switch 530. For example, the identifier may refer to a switch number set using at least one dual in-line package (DIP) switch. That is, the switch number for each of the switches 510, 520, and 530 may be set in advance by use of at least one DIP switch, and the predetermined switch number may be used as the identifier of each of the switches. The OBD apparatus 400 may select a switch for performing a diagnosis in a process of generating the diagnostic request message and may generate the diagnostic request message including the identifier of the selected switch.

That is, the first switch 510 may identify the identifier of the third switch 530 included in the diagnostic request message, and determine that the received diagnostic request message is a message for diagnosis of the third switch 530. Also, the second switch 520 may identify the identifier of the third switch 530 included in the diagnostic request message, and determine that the received diagnostic request message is a message for diagnosis of the third switch 530. Meanwhile, the third switch 530 may also identify the identifier of the third switch 530 included in the diagnostic request message, and may determine that the received diagnostic request message is a diagnostic request message transmitted to the third switch 530 itself.

As such, the third switch 530 may identify the indicator (or, the PWM-modulated diagnostic request message itself) indicating the diagnostic operation included in the diagnostic request message, and may perform the diagnostic operation indicated by the identified indicator (or, the PWM-modulated diagnostic request message itself). Here, the diagnostic request message may include an indicator indicating at least one of an operation of resetting the third switch 530, an operation of resetting the PHY layers 532-1, 532-2, and 532-3 included in the third switch 530, an operation of checking reception link states of the PHY layers 532-1, 532-2, and 532-3 included in the third switch 530, and an operation of checking transmission link states of the PHY layers 532-1, 532-2, and 532-3 included in the third switch 530. Here, it may be assumed that the indicator indicating the diagnostic operation included in the diagnostic request message is an indicator indicating the diagnostic operation of checking reception link states of the PHY layer devices 532-2 and 532-3, except for the PHY layer 532-1, among the PHY layers 532-1, 532-2, and 532-3 included in the third switch 530.

As such, the third switch 530 may generate a first message for determining states of the PHY layers 532-2 and 532-3. For example, the third switch 530 may generate a first message for determining states of the PHY layers 532-2 and 532-3 via the controller 531. Thereafter, the first message generated in the controller 531 of the third switch 530 may be transmitted to the PHY layers 532-3 and 532-3. Thereafter, the third switch 530 may transmit the generated first message to the fourth end node 570 and the fifth end node 580 (S802). The third switch 530 may transmit the first message to the fourth end node 570 via the PHY layer 532-2 connected to the PHY layer 572 of the fourth end node 570, and may transmit the first message to the fifth end node 580 via the PHY layer 532-3 connected to the PHY layer 582 of the fifth end node 580.

The fourth end node 570 may then receive the first message from the third switch 530 via the PHY layer 572. The fourth end node 570 may then generate a second message (or ACK message) which is a response to the first message. Thereafter, the fourth end node 570 may transmit the generated second message to the third switch 530 via the PHY layer 572 (S803). Meanwhile, the fifth end node 580 may also receive the first message from the third switch 530 via the PHY layer 582. As such, the fifth end node 580 may also generate a second message (or ACK message) which is a response to the first message. The fifth end node 580 may then transmit the generated second message (or ACK message) to the third switch 530 via the PHY layer 582 (S804).

Meanwhile, the third switch 530 may receive the second messages (or ACK messages) from the fourth end node 570 and the fifth end node 580. The third switch 530 may receive the second message (or ACK message) from the fourth end node 570 via the PHY layer 532-2, and receive the second message (or ACK message) from the fifth end node 580 via the PHY layer 532-3. At the present time, when the third switch 530 receives the second messages from the fourth end node 570 and the fifth end node 580, the third switch 530 may determine that the PHY layer 532-2 connected to the fourth end node 570 and the PHY layer 532-3 connected to the fifth end node 580 are in the normal state. On the other hand, when the third switch 530 fails to receive the second message (or ACK message) as a response to the first message within a predetermined time from the end time of the transmission of the first message, the third switch 530 may determine that the state of the PHY layer of the third switch 530, which is connected to the end node that has not transmitted the second message (or ACK message), is in the failure state. Also, the third switch 530 may determine that the state of the end node that has not transmitted the second message (or ACK message) is in the failure state.

As such, the third switch 530 may generate a diagnostic response message (S805). Here, the diagnostic response message may include at least one indicator indicating the states of the PHY layers 532-2 and 532-3 (e.g., at least one indicator each of which indicates a failure state or a normal state of the corresponding PHY layer) and at least one identifier each of which indicates the end node determined as the failure state. As such, the third switch 530 may transmit the diagnostic response message to the OBD apparatus 400 (S806). The third switch 530 may transmit the generated diagnostic response message to the OBD apparatus 400 via the bus line through which the diagnostic request message is received. For example, in a case that the third switch 530 receives the diagnostic request message via the first bus line, the third switch 530 may transmit the diagnostic response message through the first bus line. Also, in a case that the third switch 530 receives the diagnostic request message via the second bus line, the third switch 530 may transmit the diagnostic response message through the second bus line.

As such, the OBD apparatus 400 may receive the diagnostic response message from the third switch 530, which is a response to the diagnostic request message. As such, the OBD apparatus 400 may identify the failure state by identifying the at least one indicator and the at least one identifier which are included in the diagnostic response message (S807).

According to the above-described methods, the OBD apparatus 400 may be able to identify the failures of the end nodes 540, 550, 560, 570, and 580 connected to the switches 510, 520, and 530 or the switches 510, 520, and 530. That is, the OBD apparatus 400 may selectively diagnose the switch 510, 520, or 530 by forming a bus topology with the switches 510, 520, and 530 through the first bus line and the second bus line. For example, in the hierarchical structure in which the OBD apparatus 400 is connected to the first switch 510, the first switch 510 is connected to the second switch 520, and the second switch 520 is connected to the third switch 530, if the first switch 510 or the second switch 520 is in the failure state in a process of checking the failure state of the third switch 530, a problem may occur where the diagnostic response message is not received due to the hierarchical connections of the switches. In such a case, the OBD apparatus 400 may have difficulty in determining which one of the switches 510, 520, and 530 is in the failure state. However, in the vehicle network diagnosing methods according to the exemplary embodiments of the present invention described with reference to FIGS. 7 and 8, a switch, which is directly connected to the OBD apparatus through at least one of the first bus line and the second bus line, may be diagnosed without such the problem.

The methods according to embodiments of the present invention may be implemented as program instructions executable by a variety of computers and recorded on a computer readable medium. The computer readable medium may include a program instruction, a data file, a data structure, or a combination thereof. The program instructions recorded on the computer readable medium may be designed and configured for an exemplary embodiment of the present invention or can be publicly known and available to those who are skilled in the field of computer software. Examples of the computer readable medium may include a hardware device including ROM, RAM, and flash memory, which are configured to store and execute the program instructions. Examples of the program instructions include machine codes made by, for example, a compiler, as well as high-level language codes executable by a computer, using an interpreter. The above exemplary hardware device can be configured to operate as at least one software module to perform the operation of the present invention, and vice versa.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An operation method of a first switch among a plurality of switches in a vehicle network including the plurality of switches, the operation method comprising:
   receiving a diagnostic request message from an on-board diagnostic (OBD) apparatus through the bus line;
   performing a diagnostic operation indicated by the diagnostic request message; and
   transmitting a result of the diagnostic operation to the OBD apparatus through the bus line,
   wherein the plurality of switches are connected in a first topology and connected through the bus line in a second topology in addition to the first topology, the first topology is different from the second topology, and the second topology is a bus topology,
   wherein the plurality of switches are connected through at least one of a first bus line for performing a pulse width modulation (PWM) based diagnosis and a second bus line for performing a power line communication (PLC) based diagnosis, and the second bus line connects power circuits each of which is disposed in each of the plurality of switches, and
   wherein the performing of the diagnostic operation further includes:
      when a power circuit of the first switch connected to the second bus line receives the diagnostic request message, transmitting, by the power circuit of the first switch, the diagnostic request message to a controller of the first switch;
      generating, by the controller of the first switch, a first message including an indicator indicating the diagnostic operation;
      transmitting, by the controller of the first switch, the generated first message to a physical (PHY) layer of the first switch; and
      performing, by the PHY layer of the first switch, the diagnostic operation indicated by the indicator.

2. The operation method according to claim 1, wherein the first bus line connects controllers each of which is disposed in each of the plurality of switches.

3. The operation method according to claim 2, wherein the performing the diagnostic operation further includes:
   when a controller of the first switch connected to the first bus line receives the diagnostic request message, generating, by the controller of the first switch, a first message including an indicator indicating the diagnostic operation;
   transmitting, by the controller of the first switch, the generated first message to a physical (PHY) layer of the first switch; and
   performing, by the PHY layer of the first switch, the diagnostic operation indicated by the indicator.

4. The operation method according to claim 3, wherein the diagnostic request message received through the controller of the first switch connected to the first bus line is transmitted at a predetermined frequency for performing the PWM based diagnosis, and the diagnostic request message is modulated with a duty ratio indicating the diagnostic operation.

5. The operation method according to claim 1, wherein an identifier of each of the plurality of switches is configured based on at least one dual in-line package (DIP) switch, and the diagnostic request message includes an identifier configured for the first switch.

6. The operation method according to claim 1, wherein the diagnostic request message includes an indicator indicating at least one of an operation of resetting the first switch, an operation of resetting at least one physical (PHY) layer included in the first switch, an operation of checking reception link state of the at least one PHY layer included in the first switch, and an operation of checking transmission link state of the at least one PHY layer included in the first switch.

7. An operation method of an on-board diagnostic (OBD) apparatus for diagnosing a plurality of switches included in a vehicle network, the operation method comprising:
generating a diagnostic request message for diagnosing a first switch of the plurality of switches;
transmitting the generated diagnostic request message to the first switch via a bus line;
receiving a diagnostic response message including information on a diagnostic result of the first switch from the first switch; and
identifying a normal state or a failure state of the first switch based on the diagnostic response message,
wherein the plurality of switches are connected in a first topology and connected through the bus line in a second topology in addition to the first topology, the first topology is different from the second topology, and the second topology is a bus topology,
wherein the plurality of switches are connected through at least one of a first bus line for performing a pulse width modulation (PWM) based diagnosis and a second bus line for performing a power line communication (PLC) based diagnosis, and the second bus line connects power circuits each of which is disposed in each of the plurality of switches, and
wherein, when the power circuit of the first switch connected to the second bus line receives the diagnostic request message, the diagnostic request message is transmitted by the power circuit of the first switch to a controller of the first switch, a first message including an indicator indicating a diagnostic operation is generated by the controller of the first switch, the generated first message is transmitted by the controller of the first switch to a physical (PHY) layer of the first switch, and the diagnostic operation indicated by the indicator is performed by the PHY layer of the first switch.

8. The operation method according to claim 7, wherein the operation method is performed when a diagnostic response message is not received through an Ethernet communication path in the vehicle network.

9. The operation method according to claim 7, wherein the diagnostic request message includes an indicator indicating at least one of an operation of resetting the at least one switch, an operation of resetting at least one physical (PHY) layer included in the at least one switch, an operation of checking reception link state of the at least one PHY layer included in the at least one switch, and an operation of checking transmission link state of the at least one PHY layer included in the at least one switch.

10. The operation method according to claim 7, wherein an identifier of each of the plurality of switches is configured based on at least one dual in-line package (DIP) switch, and the diagnostic request message includes at least one identifier configured for the at least one switch.

11. The operation method according to claim 7, wherein the first bus line connects controllers each of which is disposed in each of the plurality of switches.

12. A first switch of a plurality of switches in a vehicle network, the first switch comprising a controller, at least one physical (PHY) layer, and a power circuit for supplying power to the first switch, wherein
the controller receives a diagnostic request message from an on-board diagnostic (OBD) apparatus connected to a bus line;
the controller identifies a diagnostic operation indicated by the diagnostic request message;
the controller transmits an indicator requesting to perform the diagnostic operation to the at least one PHY layer; and
the at least one PHY layer receiving the indicator performs the diagnostic operation requested by the indicator,
wherein the plurality of switches are connected in a first topology and connected through the bus line in a second topology in addition to the first topology, the first topology is different from the second topology, and the second topology is a bus topology,
wherein the plurality of switches are connected through at least one of a first bus line for performing a pulse width modulation (PWM) based diagnosis and a second bus line for performing a power line communication (PLC) based diagnosis, and the second bus line connects power circuits each of which is disposed in each of the plurality of switches, and
wherein the performing of the diagnostic operation further includes:
when a power circuit of the first switch connected to the second bus line receives the diagnostic request message, transmitting, by the power circuit of the first switch, the diagnostic request message to a controller of the first switch;
generating, by the controller of the first switch, a first message including an indicator indicating the diagnostic operation;
transmitting, by the controller of the first switch, the generated first message to a physical (PHY) layer of the first switch; and
performing, by the PHY layer of the first switch, the diagnostic operation indicated by the indicator.

13. The first switch according to claim 12, wherein the first bus line connects controllers each of which is disposed in each of the plurality of switches.

14. The first switch according to claim 12, wherein the diagnostic request message includes an indicator indicating at least one of an operation of resetting the at least one PHY) layer, an operation of checking reception link state of the at least one PHY layer, and an operation of checking transmission link state of the at least one PHY layer.

* * * * *